United States Patent
Lin et al.

(10) Patent No.: US 11,246,149 B2
(45) Date of Patent: Feb. 8, 2022

(54) METHOD AND APPARATUS FOR PERFORMING UPLINK TRANSMISSIONS FOR MULTIPLE TRANSMISSION/RECEPTION POINTS (TRP) IN A WIRELESS COMMUNICATION SYSTEM

(71) Applicant: ASUSTek Computer Inc., Taipei (TW)

(72) Inventors: Ko-Chiang Lin, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 102 days.

(21) Appl. No.: 15/857,074

(22) Filed: Dec. 28, 2017

(65) Prior Publication Data

US 2018/0199360 A1   Jul. 12, 2018

Related U.S. Application Data

(60) Provisional application No. 62/443,306, filed on Jan. 6, 2017.

(51) Int. Cl.
*H04W 72/12*   (2009.01)
*H04B 7/0452*   (2017.01)
*H04B 7/06*   (2006.01)
*H04L 5/00*   (2006.01)
*H04W 56/00*   (2009.01)
*H04W 72/04*   (2009.01)

(52) U.S. Cl.
CPC ...... *H04W 72/1268* (2013.01); *H04B 7/0452* (2013.01); *H04B 7/0617* (2013.01); *H04B 7/0665* (2013.01); *H04L 5/0082* (2013.01); *H04W 56/0045* (2013.01); *H04L 5/005* (2013.01); *H04L 5/0048* (2013.01); *H04W 72/046* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2015/0016428 A1* | 1/2015 | Narasimha | H04W 72/1215 370/336 |
| 2015/0365218 A1 | 12/2015 | Yang | |
| 2016/0095003 A1* | 3/2016 | Yu | H04B 7/0695 370/311 |
| 2016/0352403 A1* | 12/2016 | Kishiyama | H04B 7/0413 |
| 2017/0317866 A1* | 11/2017 | Stirling-Gallacher | H04B 7/0695 |
| 2018/0042052 A1* | 2/2018 | Harjula | H04W 72/12 |
| 2018/0235013 A1* | 8/2018 | Jung | H04W 74/0833 |
| 2018/0316468 A1* | 11/2018 | Kishiyama | H04L 5/0092 |
| 2019/0141590 A1* | 5/2019 | Li | H04W 52/245 |
| 2019/0222364 A1* | 7/2019 | Shimoda | H04L 1/1887 |
| 2019/0349063 A1* | 11/2019 | Takano | H04W 24/10 |

* cited by examiner

*Primary Examiner* — Saad Khawar
(74) *Attorney, Agent, or Firm* — Cooper Legal Group, LLC

(57) ABSTRACT

A method and apparatus are disclosed from the perspective of a User Equipment (UE). In one embodiment, the method includes the UE receiving from a base station a first information indicating multiple sets of transmission occasions for a signal. The method also includes the UE receiving from the base station a second information indicating an association between a transmission occasion of the signal and a base station beam.

18 Claims, 16 Drawing Sheets

(a) Digital beamforming (b) Analogue beamforming (c) Hybrid beamforming: Left = fully connected, Right = sub-array

METHOD AND APPARATUS FOR PERFORMING UPLINK TRANSMISSIONS FOR MULTIPLE TRANSMISSION/RECEPTION POINTS (TRP) IN A WIRELESS COMMUNICATION SYSTEM

CROSS-REFERENCE TO RELATED APPLICATIONS

The present Application claims the benefit of U.S. Provisional Patent Application Ser. No. 62/443,306 filed on Jan. 6, 2017, the entire disclosure of which is incorporated herein in its entirety by reference.

FIELD

This disclosure generally relates to wireless communication networks, and more particularly, to a method and apparatus for performing uplink transmissions for multiple TRPs in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes the UE receiving from a base station a first information indicating multiple sets of transmission occasions for a signal. The method also includes the UE receiving from the base station a second information indicating an association between a transmission occasion of the signal and a base station beam.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; TS 36.213 v13.2.0, "E-UTRA; Physical layer procedures (Release 14)"; TS 36.101 v14.1.0, "E-UTRA User Equipment (UE) radio transmission and reception (Release 14)"; and TS 36.321 v14.0.0, "Medium Access Control (MAC) protocol specification (Release 14)". The standards and documents listed above are hereby expressly incorporated by reference in their entirety.

Figure 1:
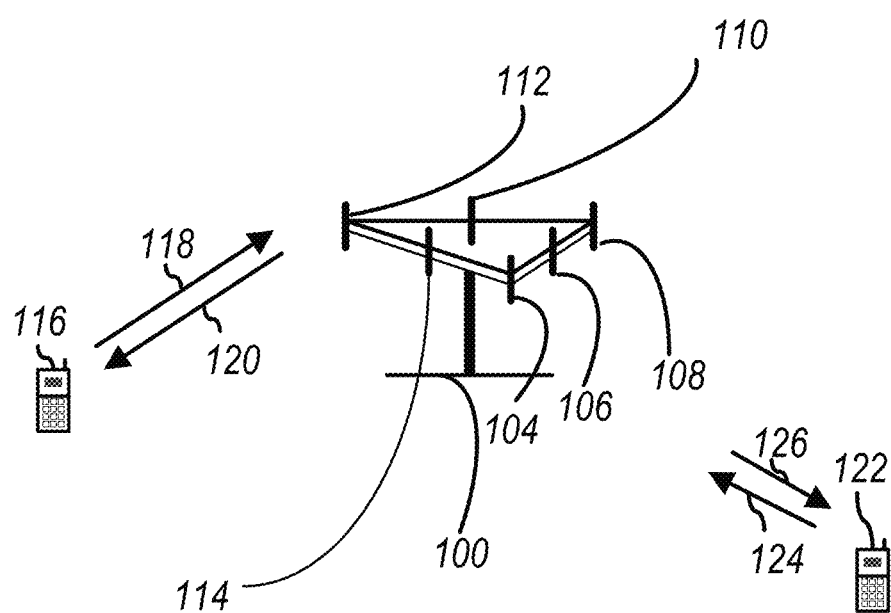
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
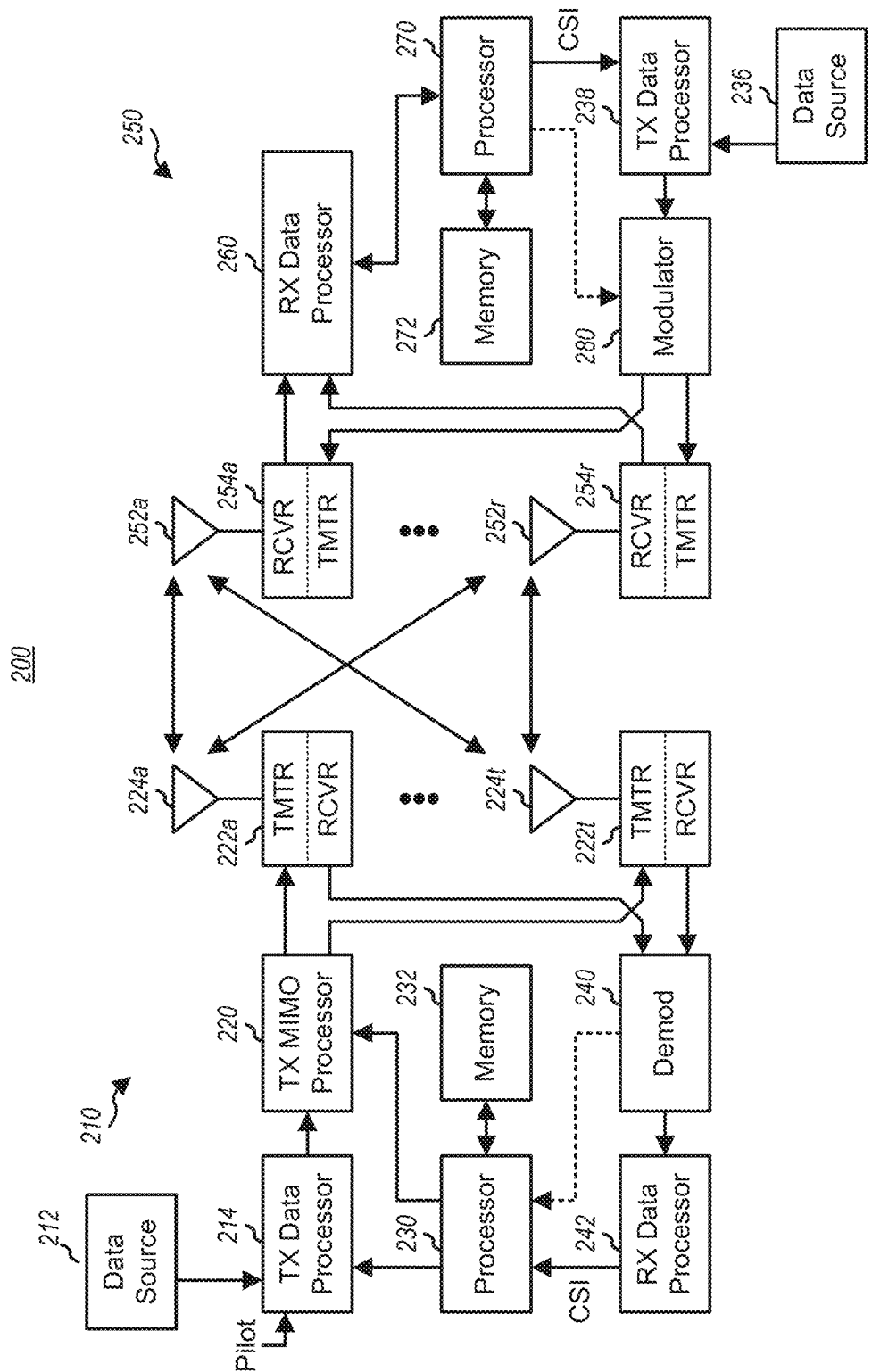
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
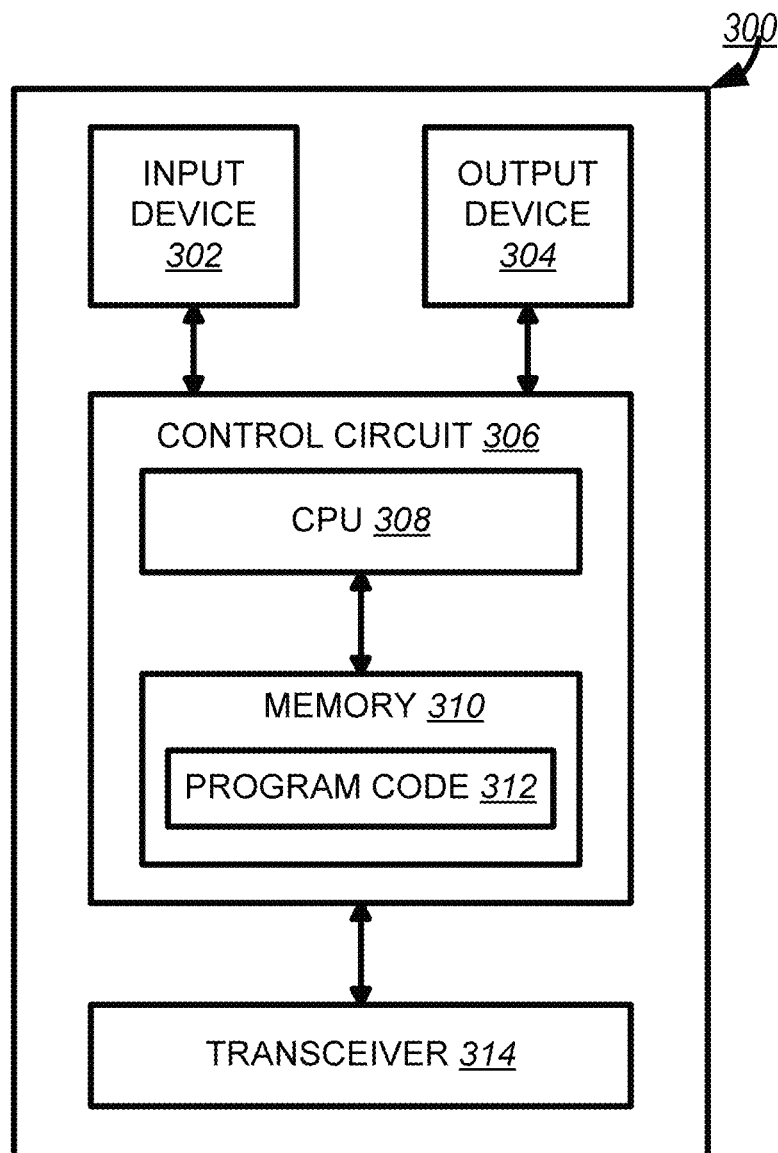
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
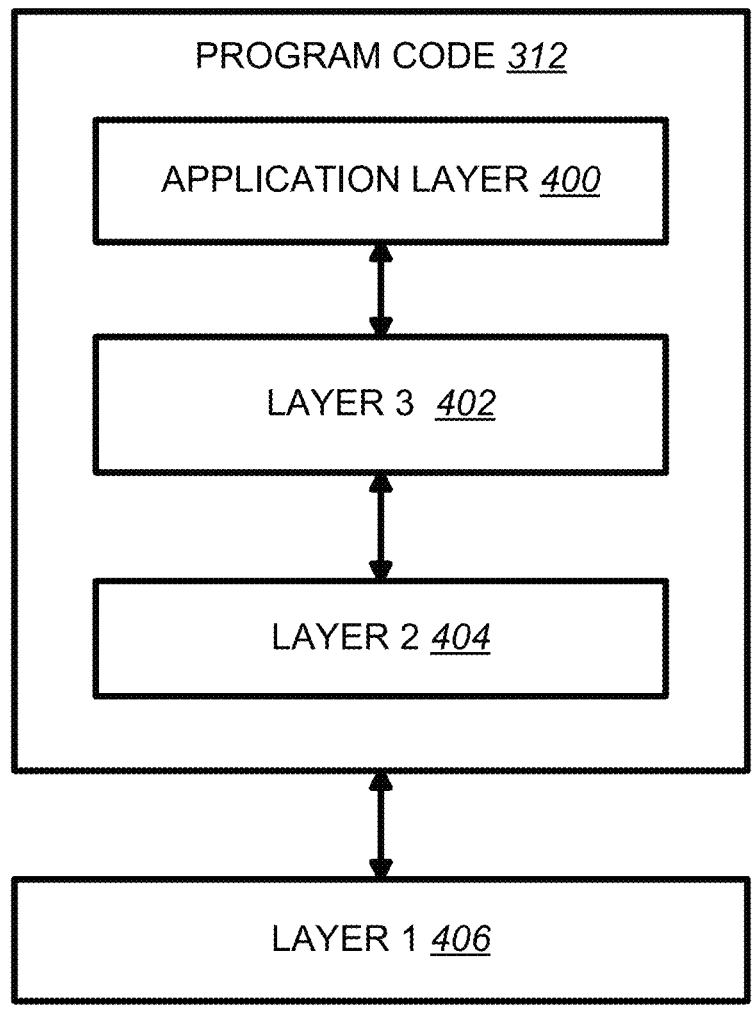
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands<6 GHz), the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam. Therefore, multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is generally a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be categorized into three types of implementation: digital beamforming, hybrid beamforming, and analog beamforming. For digital beamforming, the beam is generated on the digital domain, i.e., the weighting of each antenna element can be controlled by baseband (e.g., connected to a TXRU). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

Figure 5:
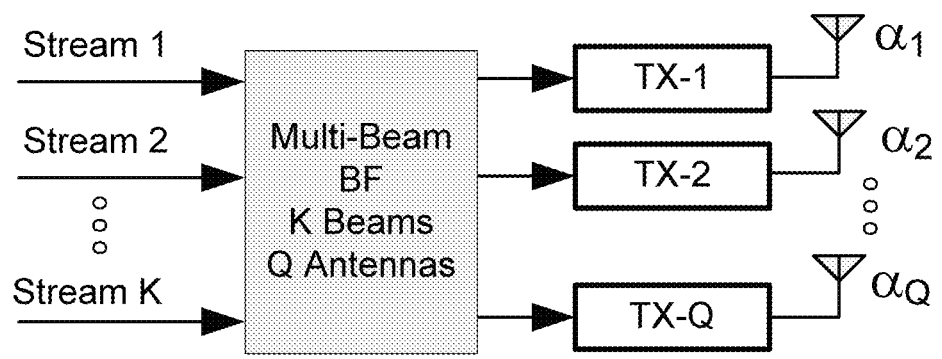
FIG. 5 illustrates three exemplary types of beamforming according to one exemplary embodiment.
Figure 5:
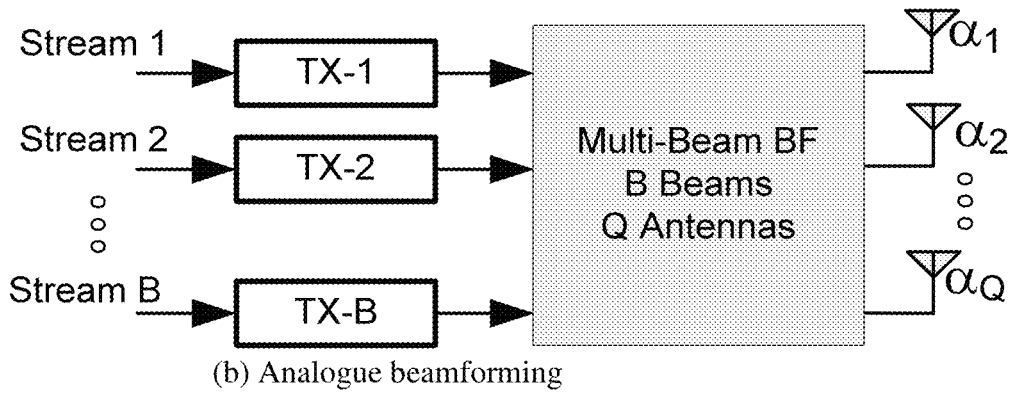
Figure 5:
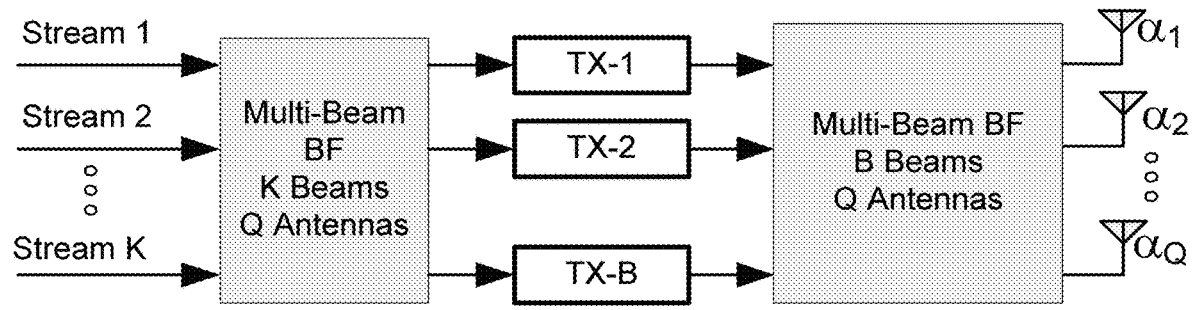
Figure 5:
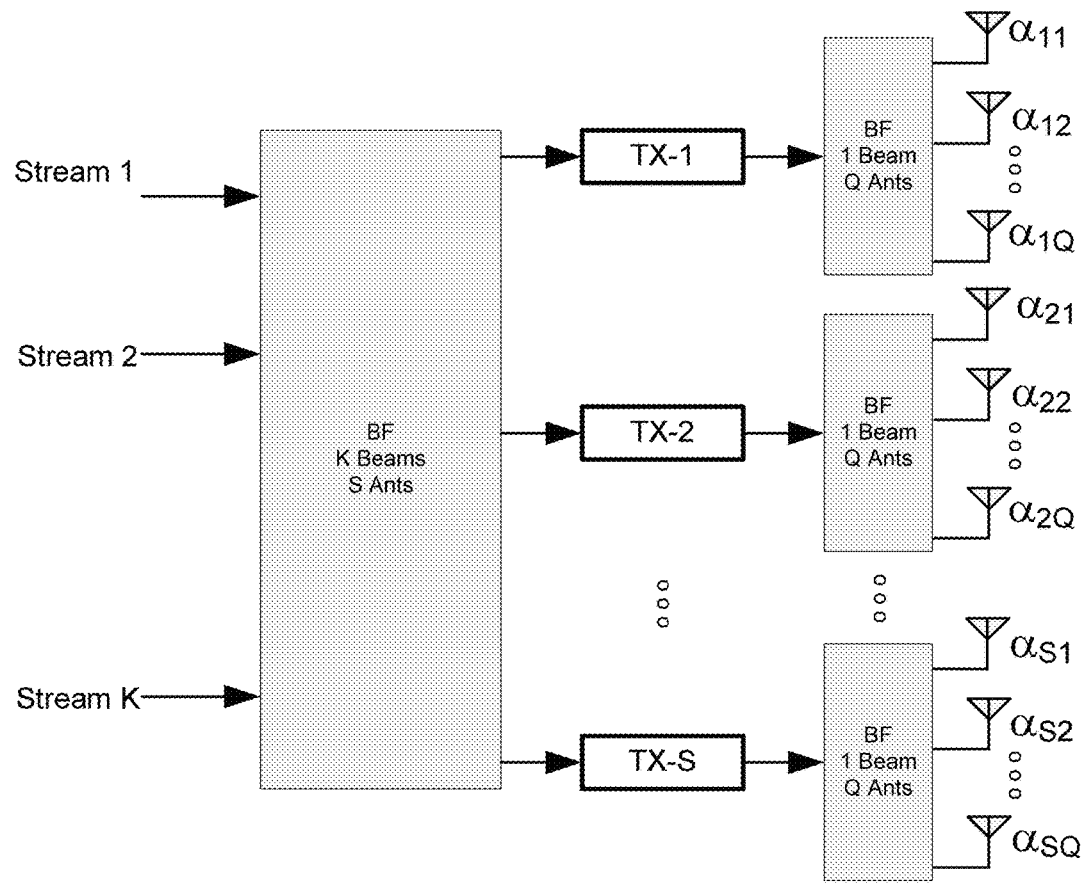

For Analog beamforming, the beam is generated on the analog domain, i.e., the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. Examples of the three types of beamforming are shown in FIG. 5.

In 3GPP R2-162709, an eNB may have multiple TRPs (either centralized or distributed). Each TRP can form multiple beams. The number of beams and the number of simultaneous beams in the time/frequency domain depend on the number of antenna array elements and the RF at the TRP.

Potential mobility type for NR can be listed as follows:
Intra-TRP mobility
Inter-TRP mobility
Inter-NR eNB mobility In 3GPP R2-162762, reliability of a system purely relying on beamforming and operating in higher frequencies might be challenging, since the coverage might be more sensitive to both time and space variations. As a consequence of that the SINR of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs can transmit the same data to the UE. To increase the throughput, it is also possible for a single TRP to transmit different data on different beams for the UE. Also, multiple TRPs can transmit different data on different beams to the UE.

Depending on UE capability, a UE may also generate a narrow beam when transmitting or receiving data/signal and may suffer from above restriction of base station beam, i.e., the number of UE beams can be generated simultaneously is limited. The following UE beam could correspond to beam(s) generated by a UE when transmitting or receiving signals, to distinguish from base station beam or network beam, which refers to beam(s) generated by a base station or network node when transmitting or receiving signals. If it is not specifically mentioned, the following beam can refer to a base station beam, a UE beam, or both.

A UE may be configured with certain uplink transmission opportunities. Sounding reference signal (SRS) can be configured to be transmitted by the UE, which allows a base station to know the channel status of a UE. The measurement in the base station side can serve several purposes. One exemplary purpose is to acquire uplink channel quality, in which case the signal required to be transmitted in a whole bandwidth (could be, for example, a one-shot wide band transmission or multi-shot sub-band transmissions).

Another exemplary purpose is to detect the beam or to maintain the base station beam or UE beam of the UE. The transmission opportunities of SRS can be configured periodically by higher layer, e.g., RRC (Radio Resource Control). The transmission opportunities of SRS can be configured by an associated trigger, which has finite opportunities (e.g., one-shot) and is known as aperiodic SRS. Another fashion of SRS is semi-persistent SRS, where the transmission opportunities would be configured by an associated trigger and periodically transmitted if trigged until receiving another trigger, which might stop the SRS transmission or update the SRS transmission (e.g., update the resource/periodicity/transmission occasions). Another example of uplink transmission is a scheduling request (SR). A scheduling request can be used by a UE to request UL resource from the base station. Resource for a scheduling request can, for example, be configured periodically and dedicated for the UE. If UE has some data to transmit to the base station while there is no uplink grant for transmission, a scheduling request can be sent to the base station. If the base station detects SR from the UE, the base station would schedule some uplink resource to the UE.

A UE may be served by more than one TRP, where one or multiple base station beam(s) from each TRP could be used to transmit data or signal to the UE. One or multiple base station beam(s) from all the serving TRP(s) could form a base station beam set of the UE.

Uplink transmissions perform by the UE may be transmitted to a specific base station beam or a specific TRP. Uplink transmissions perform by the UE may be transmitted to multiple base station beams or multiple TRPs. The two types of arrangements above may be applied to different channels or different signals depending on the purposes of the channel or the signal. For example, a SRS may need to be transmitted to base station beams or TRPs which might serve the UE for the purpose of UL channel measurement. To achieve the goal, one possibility is to transmit SRS(s) where each SRS could be monitored or detected by multiple base station beams or TRPs. A second possibility is to transmit SRSs where each SRS could be monitored or detected by one base station beam or one TRP and different SRS transmission occasions would be monitored or detected by different base station beams or different TRPs.

On the other hand, for scheduling request, as the intention is to notify the base station there is a need for uplink grant, it may not matter much which base station beam or which TRP receives the scheduling request. Therefore for scheduling request, it may be sufficient that the scheduling request is targeting to a specific base station beam or TRP. Besides, even some channels or signals may use a same type of arrangement (e.g., the transmission is targeting to a specific beam or a specific TRP). Different channels or signals may target different base station beams or different TRPs.

Even if the target may be clear, there might be some factors in real situations which need to be taken into account. One factor is the beam (either base station beam/UE beam/or both) may be changed from time to time. For example, the beam change may be due to UE mobility, UE rotation, blockage from other article/entity. Under such case, if the targeting beam/TRP of a channel/signal is blocked or gone (and even if other beam(s)/TRP(s) is still there), the channel or signal may not be transmitted or may be transmitted while the transmission would be failed. Some further delay would be required (for example, when the beam/TRP is back, or if the situation is detected and targeting beam/TRP is changed to another beam/TRP).

Another factor could be timing advance of the uplink transmission. The timing advance is used to compensate the roundtrip time (RTT) between a UE and a base station so that the transmissions in the same time duration (e.g., subframe/slot/mini-slot) of different UEs at different locations would arrive the base station at similar timing. The interference between a transmission of a time duration and a transmission of a next time duration, as well as the interference between transmissions within a same time duration, can be avoided or reduced. As the timing advance is related to round trip time, the distance between the UE and the base station would determine the value of the timing advance. In the situation where one UE served by multiple TRPs, the optimized timing advance values may be different for different TRPs given the distances are different as well. In such a case, how to decide the TA (Timing Advance) value(s) for an uplink transmission considering above different types of arrangements could become an issue.

A third factor is UE beam forming. As different UE beams may be associated with different base stations beams or different TRPs, how to decide the UE beam(s) for an uplink transmission considering above different types of arrangements could become another issue. Note that the association here may means the UE beam(s) and base station beam/TRP are the best companion (e.g., could result in the best channel quality). The association here may also mean the UE can only receive or transmit to the base station beam/TRP with the associated UE beam. In the following text, a consideration of how to arrange the type of some uplink transmissions taken into account the three factors individually or jointly and its corresponding impact is discussed.

A first general concept of this invention is that different uplink channels/signals which apply TA would use different lengths of cyclic prefix (CP). In one embodiment, each CP length corresponds to a different accuracy level of TA value respectively. For example, a channel or signal with a shorter CP length would correspond to a TA value with higher accuracy level while a channel or signal with a longer CP length would correspond to a TA value with a lower accuracy level.

In one embodiment, the lower accuracy level of TA value means a single TA value is applied for transmission for multiple TRPs, and the higher accuracy level of TA value means a different TA value are applied for transmission for multiple TRPs wherein each TA value is associated with one TRP. Alternatively, the lower accuracy level of TA values means that the granularity of TA value (e.g., TA step) is large; and the higher accuracy level of TA values means that the granularity of TA value (e.g. TA step) is small.

A second general concept of this invention is that for an uplink channel or signal with a low TA accuracy level, a UE uses a specific TA value to be TA for the channel or signal targeting to multiple TRPs. In one example, the specific TA value is a TA value of one of the multiple TRPs (e.g., a TRP with the smallest TA value, a TRP with the largest TA value, or a TRP with medium TA values of the multiple TRPs). In another example, the specific TA value is computed based on TA values of the multiple TRPs (e.g., an average of the TA values of the multiple TRPs). The UE could use an omni-directional beam for the transmission of the uplink channel or signal. Alternatively, the UE could use a specific UE beam for the transmission of the uplink channel or signal. The specific UE beam could, in turn, change from time to time.

A third general concept of this invention is that for an uplink channel or signal with a high TA accuracy level, a UE uses a corresponding TA value to be TA for the channel or signal targeting a TRP. In one embodiment, the association between a resource (or transmission) occasion of the uplink channel or signal and a TRP, a base station beam, a UE beam, or a TA value is configured or indicated by the base station. The UE would perform the configured (or indicated) transmission of the uplink channel or signal with the associated TA value for the TRP, the base station beam, the UE beam, or the TA value. The UE may maintain an association (or linkage) between any two among the following: TRPs, base station beams, UE beams, or TA values.

A fourth general concept of this invention is that for an uplink channel/signal, a UE uses a corresponding UE beam to transmit the channel or signal targeting a TRP. In one embodiment, the uplink channel or signal has a high TA accuracy level. The association between a resource (or transmission) occasion of the uplink channel or signal and a TRP, a base station beam, a UE beam, or a TA value is configured or indicated by the base station. UE would perform the configured (or indicated) transmission of the uplink channel or signal with the associated UE beam for the TRP, base station beam, UE beam, or TA value. The UE may maintain an association/linkage between any two among the following: TRPs, base station beams, UE beams, or TA values.

A fifth general concept of the invention is that for an uplink channel or signal with a high TA accuracy level, there are multiple resources configured (or indicated). Each of the multiple resources would be associated with different TRPs. A UE would select one of the TRPs, the base station beams, the UE beams, or the TA values, and would use the resources associated with the selected one to perform transmission of the uplink channel/signal. In one embodiment, a transmission of the uplink channel/signal is performed with a TA value or UE beam associated with the selected TRP, base station beam, UE beam, or TA value. In one example, the selection could be based on a configured priority. In another example, the selection could be based on a type of TRP, base station beam, UE beam, or TA value (e.g., a type could be serving TRP or beam). The selection could be based on the TA value (e.g., the smallest TA value or the largest TA value). In another example, the selection could be based on a DL (Downlink) measurement (e.g., the strongest TRP, base station beam, or UE beam).

In one embodiment, the multiple resources could be on the same time duration (or symbol). Alternatively, the multiple resources could be on different time durations (or symbols). In another example of selection, the TRP, base station beam, UE beam, or TA value whose resource is closest could be selected.

In any of the above concepts or combinations of the above concepts, the channel or signal could be SRS or SR.

In one embodiment, a UE could transmit a first channel or signal with a first cyclic prefix length, and could transmit a second channel or signal with a second cyclic prefix length, wherein timing advance is applied for both the first channel/signal and the second channel/signal. More specifically, applying the timing advance could mean that a TA value to compensate for the RTT (Round Trip Time) of the UE is added on top of the downlink reception timing and non-zero constant (e.g., TA offset for TDD to calculate the uplink transmission timing).

In one embodiment, the UE could transmit a third channel or signal with a third cyclic prefix. The timing advance may not be applied for the third channel or signal. The third cyclic prefix length could be longer than the first cyclic prefix length and the second cyclic prefix length; and the first cyclic prefix length could be longer than the second cyclic prefix length.

In one embodiment, the first channel or signal could have a first TA value with less accurate level, and the second channel could have a second TA value with a more accurate level. The first channel or signal could be targeting multiple TRPs, and the second channel or signal could be targeting one specific TRP. In one embodiment, the first channel or signal could be a reference signal, which could be SRS. Alternatively, the first channel or signal could be a control channel. In one embodiment, the second channel or signal could be a data channel or a control channel. The third channel or signal could be a preamble. The TA accuracy level for the first channel/signal level can be considered as inter-TRP accuracy level; and the TA accuracy level for the second channel/signal level can be considered as intra-TRP accuracy level.

In another embodiment, a UE could use a specific TA value to be TA for a channel or signal targeting multiple TRPs/base station beams. The channel or signal could be transmitted with low TA accuracy level. The specific TA value could be the TA value of a specific TRP/base station beam. Furthermore, the specific TA value could be the smallest TA values among the TRPs or base station beams. Alternatively, the specific TA value could be the largest TA values among the TRPs (or base station) beams, or the medium TA values among the TRPs (or base station) beams. In one embodiment, the specific TA value could be derived based on TA values among the multiple TRPs or base station beams. For example, the specific TA value could be an average of TA values among the multiple TRPs or base station beams. In one embodiment, the UE could use an omnidirectional beam for the transmission of the uplink channel or signal. Alternatively, the UE could use a specific UE beam for the transmission of the uplink channel or signal. The specific UE beam may also switch in turn from time to time. In one embodiment, the channel/signal could be SRS or SR.

In another embodiment, a UE could use a corresponding TA value to be TA on resource(s) or transmission occasion(s) for a channel or signal targeting a TRP or base station beam. The uplink channel or signal could be transmitted with high TA accuracy level. In one embodiment, an association between the resource(s) or transmission occasion(s) of the uplink channel (or signal) and a TRP, a base station beam, a UE beam, or a TA value could be configured by the base station. More specifically, the resource(s) could be periodic resource(s) or semi-persistent resource(s). Alternatively, an association between a resource or transmission occasion of the uplink channel (or signal) and a TRP, a base station beam, a UE beam, or a TA value could be indicated by the base station. More specifically, the resource(s) could be aperiodic resource(s) or semi-persistent resource(s). In one embodiment, the association could be indicated or configured by mapping with a resource with a TRP id, a base station id, a UE beam id, or TA value. The UE could perform the configured or indicated transmission(s) of the uplink channel or signal with the associated TA value for the TRP, the base station beam, the UE beam, or the TA value. The corresponding TA value is the associated TA value. In one embodiment, the UE could be served by multiple TRPs. The UE could be configured with multiple sets of resources or transmission occasions, each associated with one TRP. The UE may maintain an association or linkage between any two among the following: TRPs, base station beams, UE beams, or TA values. The channel or signal could be SRS or SR.

In another embodiment, a UE determines whether to use a specific TA value or to use a corresponding TA value to be the TA for a channel or signal. In one example, the determination is done base on purpose or functionality of the channel or the signal. In another example, the determination is done based on whether the channel or the signal is targeting multiple TRPs/base station beams or single TRP/base station beam. Target of the channel or signal may be different in different transmission occasions of the channel or signal. The specific TA value could be the TA value of a specific TRP/base station beam. Alternatively, the specific TA value could be the smallest TA values among the TRPs or base station beams. Alternatively, the specific TA value could be the largest TA values among the TRPs (or base station) beams, or the medium TA values among the TRPs (or base station) beams. In one embodiment, the specific TA value could be derived based on TA values among the multiple TRPs or base station beams. For example, the specific TA value could be an average of TA values among the multiple TRPs or base station beams. The corresponding TA value is a TA value associated with a TRP, a base station beam, a UE beam, a transmission resource, or a transmission occasion. The channel or signal could be SRS or SR.

In another embodiment, a UE could use a corresponding UE beam to perform transmission on resource(s) or transmission occasion(s) for a channel or signal targeting to a TRP/base station beam. The uplink channel or signal could be transmitted with high TA accuracy level. Furthermore, an association between the resource(s) or transmission occasion(s) of the uplink channel/signal and a TRP, a base station beam, a UE beam, or a TA value is configured by the base station. More specifically, the resource(s) could be periodic resource(s) or semi-persistent resource(s). Alternatively, an association between a resource (or transmission occasion) of the uplink channel (or signal) and a TRP, a base station beam, a UE beam, or a TA value could be indicated by the base station. More specifically, the resource(s) could be aperiodic resource(s) or semi-persistent resource(s). In one embodiment, the association could be indicated or configured by mapping with resource(s) with a TRP id, base station id, UE beam id, or TA value. The UE could perform the configured or indicated transmission(s) of the uplink channel (or signal) with the associated TA value for the TRP, the base station beam, the UE beam, or the TA value. In one embodiment, the UE could be served by multiple TRPs. Furthermore, the UE could be configured with multiple sets of resources or transmission occasions, each associated with one TRP. The UE may maintain an association/linkage between any two among the following: TRPs, base station beams, UE beams, or TA values. The channel or signal could be SRS or SR.

In another embodiment, there could be multiple resources, each configured, indicated, or associated with different TRPs for a UE. The UE could select one of the TRPs, the base station beams, the UE beams, or the TA values, and could use the resources associated with the selected one to perform transmission of an uplink channel or signal. In one embodiment, the uplink channel or signal could be transmitted with a high TA accuracy level. The transmission of the uplink channel or signal is performed with a TA value or a UE beam associated with the selected TRP, the selected base station beam, the selected UE beam, or the selected TA value. In one example, the selection could be based on a configured priority. In another example, the selection could be based on a type of TRP, base station beam, UE beam, or TA value (e.g., a type could be serving TRP or beam). In an additional example, the selection could be based on the TA value (e.g., the smallest one or the largest one). In a further example, the selection could be based on a DL measurement (e.g., the strongest TRP, base station beam, or UE beam). In one embodiment, the multiple resources could be on the same time duration or symbol. Alternatively, the multiple resources could be on different time durations or symbols. In another example of selection, the TRP, base station beam, UE beam, or TA value whose resource is closest is selected. The channel or signal could be SRS or SR.

Figure 6:
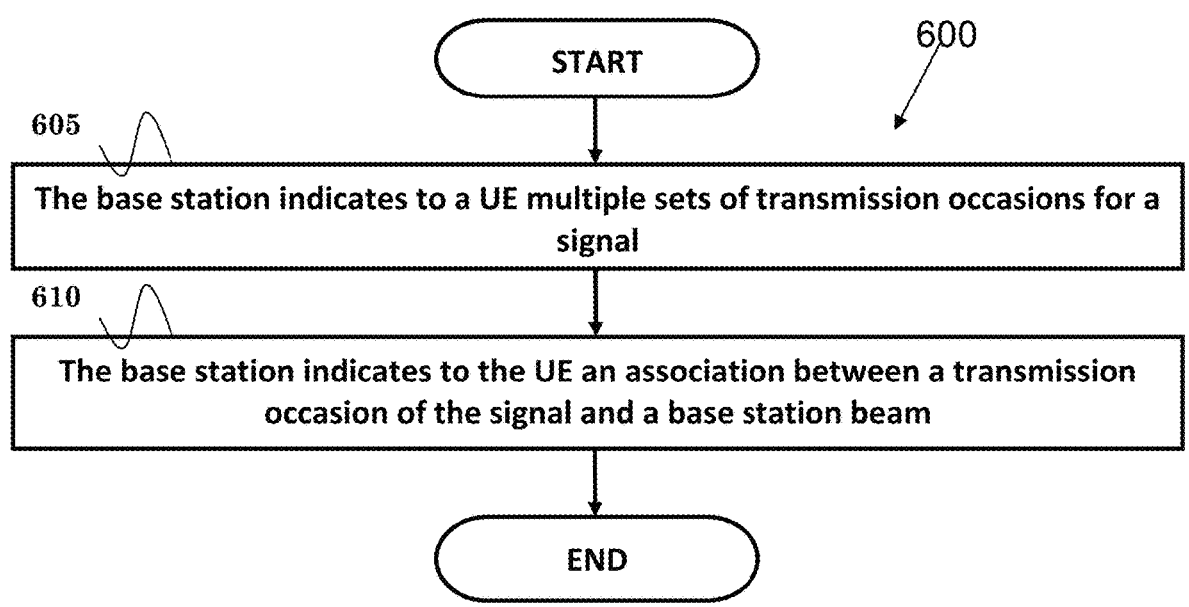
FIG. 6 is a flow chart according to one exemplary embodiment.

FIG. 6 is a flow chart 600 according to one exemplary embodiment from the perspective of a base station. In step 605, the base station indicates to a UE multiple sets of transmission occasions for a signal. In step 610, the base station indicates to the UE an association between a transmission occasion of the signal and a base station beam.

In one embodiment, the base station could receive the signal in a transmission occasion with the base station beam associated with the transmission occasion. The signal could be a sounding reference signal (SRS). Furthermore, the signal could be transmitted periodically, semi-persistently, or aperiodically.

In one embodiment, the signal could be used for channel quality acquisition of the UE. Alternatively, the signal is used for beam maintenance.

Referring back to FIGS. 3 and 4, in one exemplary embodiment of a base station, the device 300 includes a program code 312 stored in the memory 310. The CPU 308 could execute program code 312 to enable the base station (i) to indicate to a UE multiple sets of transmission occasions for a signal, and (ii) to indicates to the UE an association between a transmission occasion of the signal and a base station beam. Furthermore, the CPU 308 can execute the program code 312 to perform all of the above-described actions and steps or others described herein.

Figure 7:
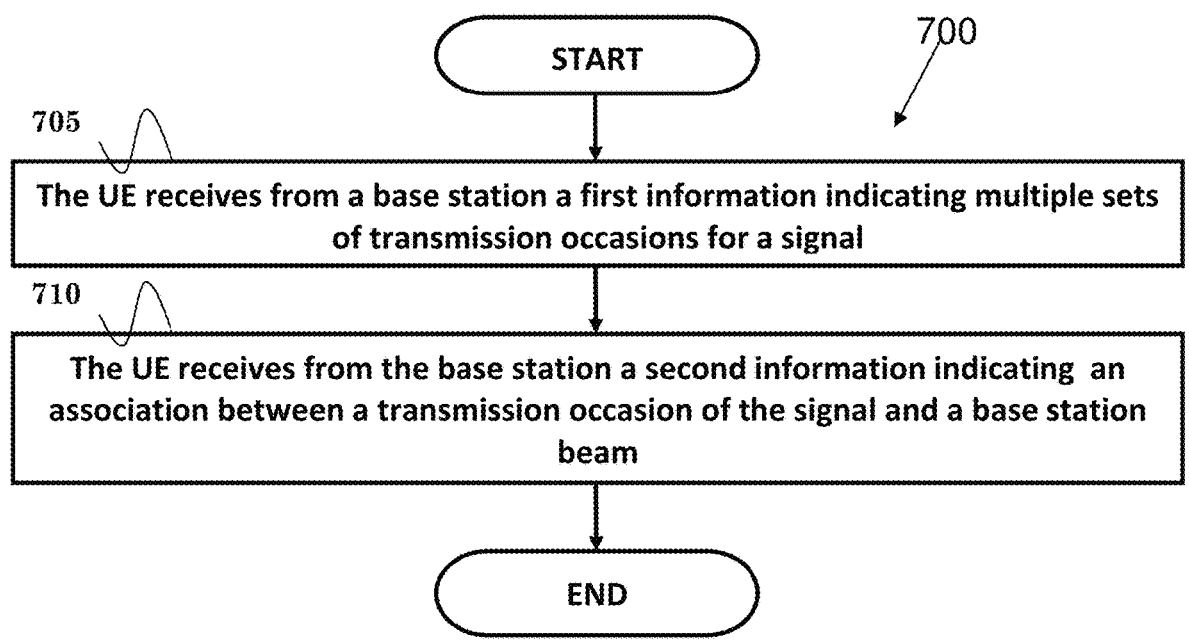
FIG. 7 is a flow chart according to one exemplary embodiment.

FIG. 7 is a flow chart 700 according to one exemplary embodiment from the perspective of a UE. In step 705, the UE receives from a base station a first information indicating multiple sets of transmission occasions for a signal. In step 710, the UE receives from the base station a second information indicating an association between a transmission occasion of the signal and a base station beam.

In one embodiment, the UE could transmit the signal in a transmission occasion with a UE beam associated with the transmission occasion. The signal could be a sounding reference signal (SRS). Furthermore, the signal could be transmitted periodically, semi-persistently, or aperiodically.

In one embodiment, the signal could be used for channel quality acquisition of the UE. Alternatively, the signal is used for beam maintenance.

Referring back to FIGS. 3 and 4, in one exemplary embodiment of a UE, the device 300 includes a program code 312 stored in the memory 310. The CPU 308 could execute program code 312 to enable the UE (i) to receive from a base station a first information indicating multiple sets of transmission occasions for a signal, and (ii) to receive from the base station a second information indicating an association between a transmission occasion of the signal and a base station beam. Furthermore, the CPU 308 can execute the program code 312 to perform all of the above-described actions and steps or others described herein.

Figure 8:
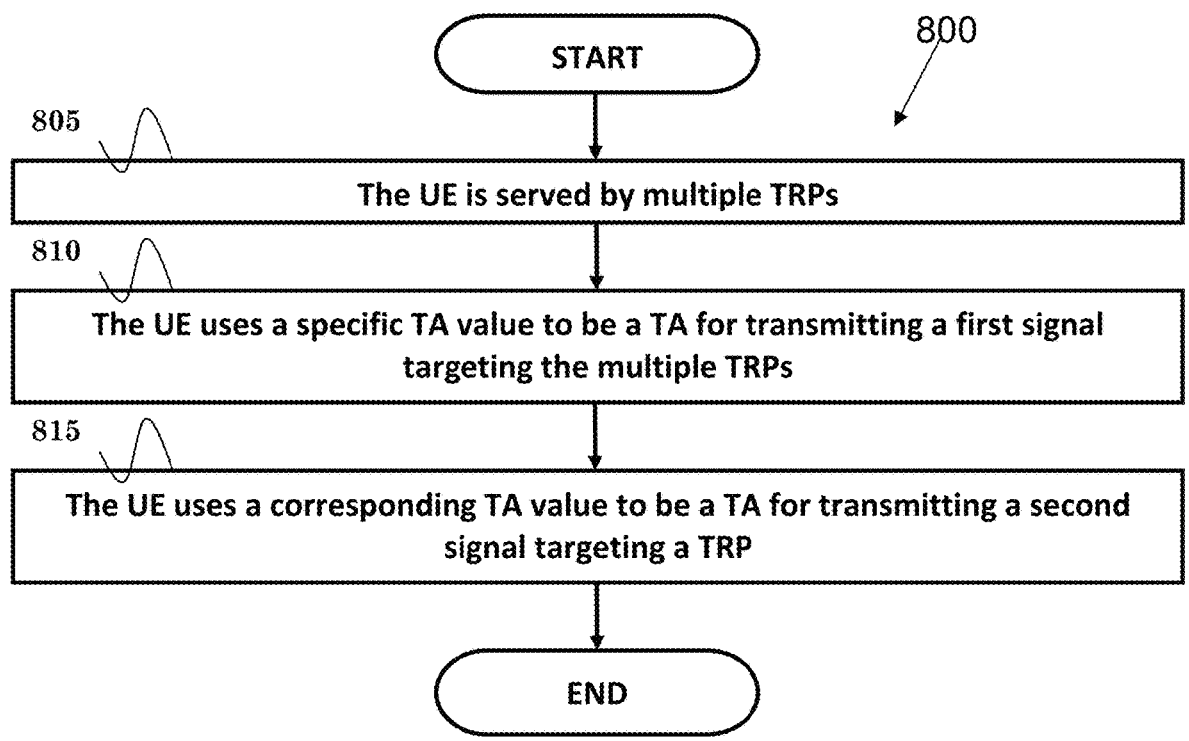
FIG. 8 is a flow chart according to one exemplary embodiment.

FIG. 8 is a flow chart 800 according to one exemplary embodiment from the perspective of a UE. In step 805, the UE is served by multiple TRPs. In step 810, the UE uses a specific TA value to be a TA for transmitting a first signal targeting the multiple TRPs. In step 815, the UE uses a corresponding TA value to be a TA for transmitting a second signal targeting a TRP.

In one embodiment, the first signal could be transmitted with a low TA accuracy level. The specific TA value could be the largest TA value of the multiple TRPs. Furthermore, the specific TA value could be derived based on TA values of the multiple TRPs.

In one embodiment, an association between resource(s) or transmission occasion(s) of the second signal and a TRP could be indicated by a base station. The second signal could be transmitted with a high TA accuracy level. Furthermore, the second signal could be transmitted with a corresponding UE beam for the TRP.

In one embodiment, the UE could be configured with multiple sets of resource(s) or transmission occasion(s) for the second signal, each set of recourse(s) or transmission(s) is associated with one TRP.

Referring back to FIGS. 3 and 4, in one exemplary embodiment of a UE that is served by multiple TRPs, the device 300 includes a program code 312 stored in the memory 310. The CPU 308 could execute program code 312 to enable the UE (i) to use a specific TA value to be a TA for transmitting a first signal targeting the multiple TRPs, and (ii) to uses a corresponding TA value to be a TA for transmitting a second signal targeting a TRP. Furthermore, the CPU 308 can execute the program code 312 to perform all of the above-described actions and steps or others described herein.

Figure 9:
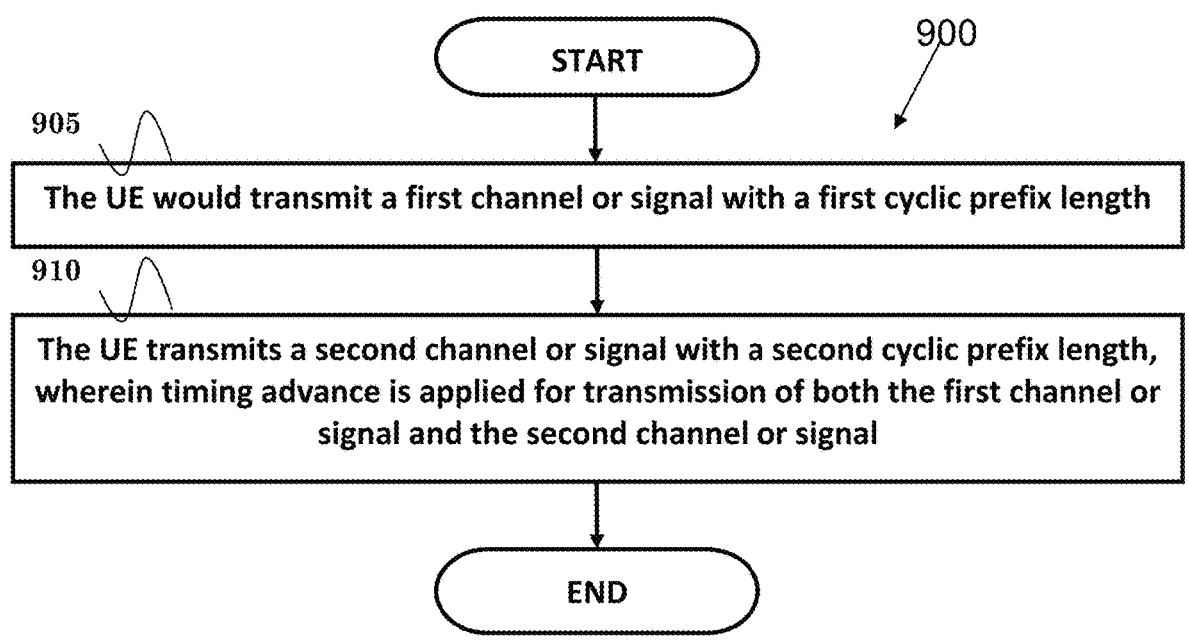
FIG. 9 is a flow chart according to one exemplary embodiment.

FIG. 9 is a flow chart 900 according to one exemplary embodiment from the perspective of a UE. In step 905, the UE would transmit a first channel or signal with a first cyclic prefix length. In step 910, the UE transmits a second channel or signal with a second cyclic prefix length, wherein timing advance is applied for transmission of both the first channel or signal and the second channel or signal.

In one embodiment, timing advance is applied means a TA value to compensate the RTT of the UE is added on top of the downlink reception timing and a non-zero constant. More specifically, the non-zero constant is TA offset of TDD.

In another embodiment, the UE would transmit a third channel or signal with a third cyclic prefix. More specifically, timing advance may not applied for the third channel or signal. In one embodiment, the third cyclic prefix length could be longer than the first cyclic prefix length and the second cyclic prefix length. The first cyclic prefix length could be longer than the second cyclic prefix length. More specifically, the first channel and signal could have a first TA value with less accurate level, and the second channel could have a second TA value with a more accurate level.

In one embodiment, the first channel or signal is targeting to multiple TRPs and the second channel or signal is targeting to one specific TRP. The first channel or signal could be a reference signal, a sounding reference signal, or a control channel. The second channel or signal could be a control channel or a data channel. The third channel or signal is a preamble.

Referring back to FIGS. 3 and 4, in one exemplary embodiment of a UE, the device 300 includes a program code 312 stored in the memory 310. The CPU 308 could execute program code 312 to enable the UE (i) to transmit a first channel or signal with a first cyclic prefix length, and (ii) to transmits a second channel or signal with a second cyclic prefix length, wherein timing advance is applied for transmission of both the first channel or signal and the second channel or signal. Furthermore, the CPU 308 can execute the program code 312 to perform all of the above-described actions and steps or others described herein.

Figure 10:
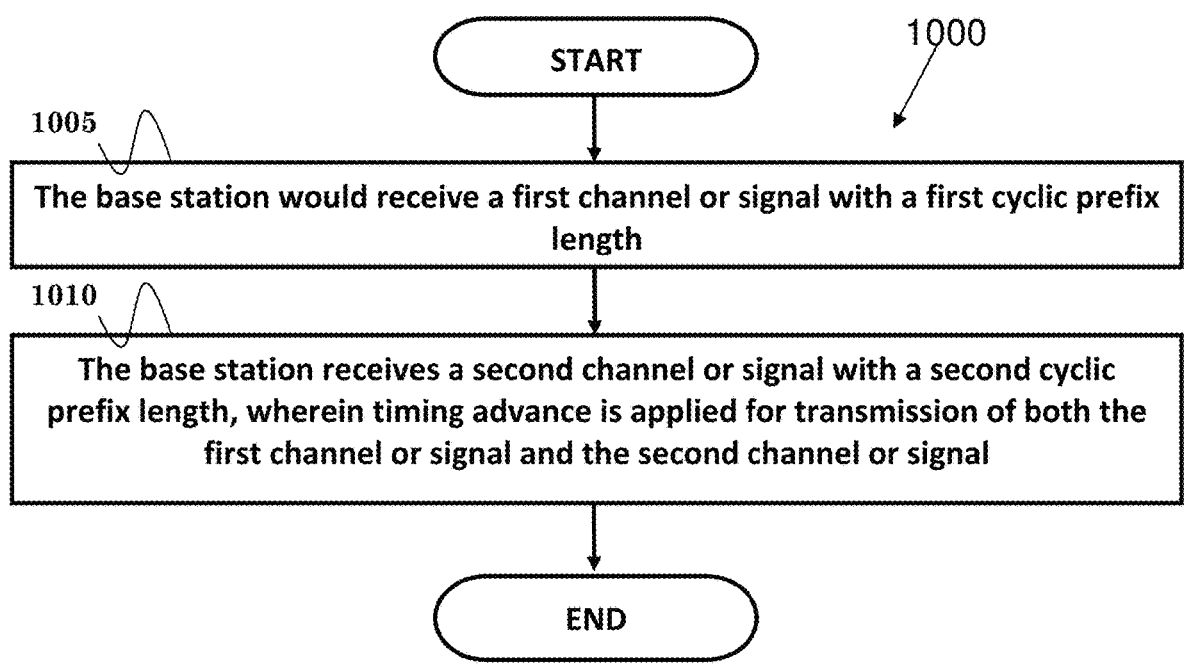
FIG. 10 is a flow chart according to one exemplary embodiment.

FIG. 10 is a flow chart 1000 according to one exemplary embodiment from the perspective of a base station. In step 1005, the base station would receive a first channel or signal with a first cyclic prefix length. In step 1010, the base station receives a second channel or signal with a second cyclic prefix length, wherein timing advance is applied for transmission of both the first channel or signal and the second channel or signal.

In one embodiment, timing advance is applied means a TA value to compensate the RTT of the UE is added on top of the downlink reception timing and a non-zero constant. More specifically, the non-zero constant is TA offset of TDD.

In another embodiment, the base station could receive a third channel or signal with a third cyclic prefix. More specifically, timing advance may not applied for the third channel or signal. In one embodiment, the third cyclic prefix length could be longer than the first cyclic prefix length and the second cyclic prefix length. The first cyclic prefix length could be longer than the second cyclic prefix length. More specifically, the first channel and signal could have a first TA value with less accurate level, and the second channel could have a second TA value with a more accurate level.

In one embodiment, the first channel or signal is targeting to multiple TRPs and the second channel or signal is targeting to one specific TRP. The first channel or signal could be a reference signal, a sounding reference signal, or a control channel. The second channel or signal could be a control channel or a data channel. The third channel or signal is a preamble.

Referring back to FIGS. 3 and 4, in one exemplary embodiment of a base station, the device 300 includes a program code 312 stored in the memory 310. The CPU 308 could execute program code 312 to enable the base station (i) to receive a first channel or signal with a first cyclic prefix length, and (ii) to receive a second channel or signal with a second cyclic prefix length, wherein timing advance is applied for transmission of both the first channel or signal and the second channel/signal. Furthermore, the CPU 308 can execute the program code 312 to perform all of the above-described actions and steps or others described herein.

Figure 11:
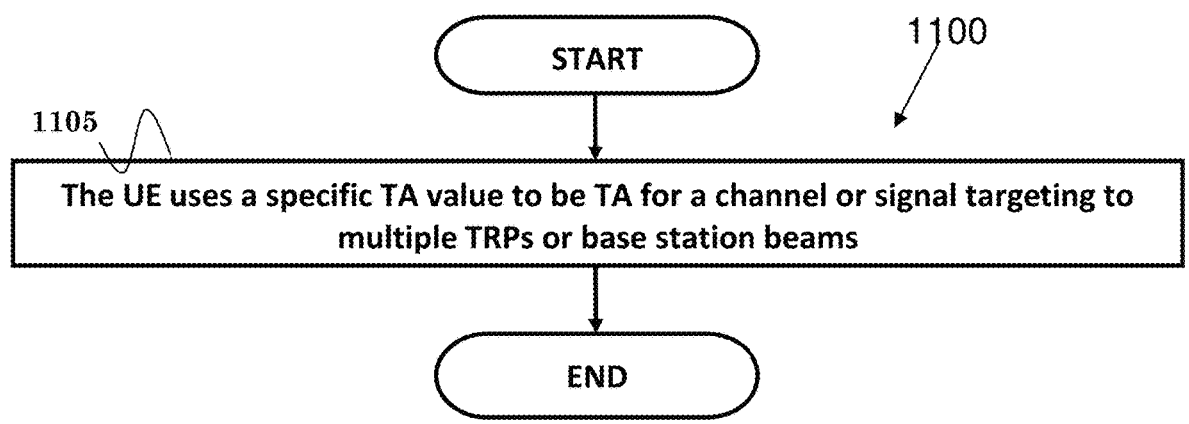
FIG. 11 is a flow chart according to one exemplary embodiment.

FIG. 11 is a flow chart 1100 according to one exemplary embodiment from the perspective of a UE. In step 1105, the UE uses a specific TA value to be TA for a channel or signal targeting to multiple TRPs or base station beams.

In one embodiment, the channel or signal could be transmitted with a low TA accuracy level.

In another embodiment, the specific TA value could be the TA value of a specific TRP/base station beam, the smallest TA values among the TRPs (or base station beams), the medium TA values among the TRPs (or base station beams), derived based on TA values among the multiple TRPs (or base station beams), or an average of TA values among the multiple TRPs (or base station beams). The UE can use an omnidirectional beam or a specific UE beam for the transmission of the uplink channel or signal.

In one embodiment, the specific UE beam could switch in turn from time to time. More specifically, a pattern of UE beam switch is configured by the base station. The channel or signal can be SRS or SR.

Referring back to FIGS. 3 and 4, in one exemplary embodiment of a UE, the device 300 includes a program code 312 stored in the memory 310. The CPU 308 could execute program code 312 to enable the UE to use a specific TA value to be TA for a channel or signal targeting to multiple TRPs/base station beams. Furthermore, the CPU 308 can execute the program code 312 to perform all of the above-described actions and steps or others described herein.

Figure 12:
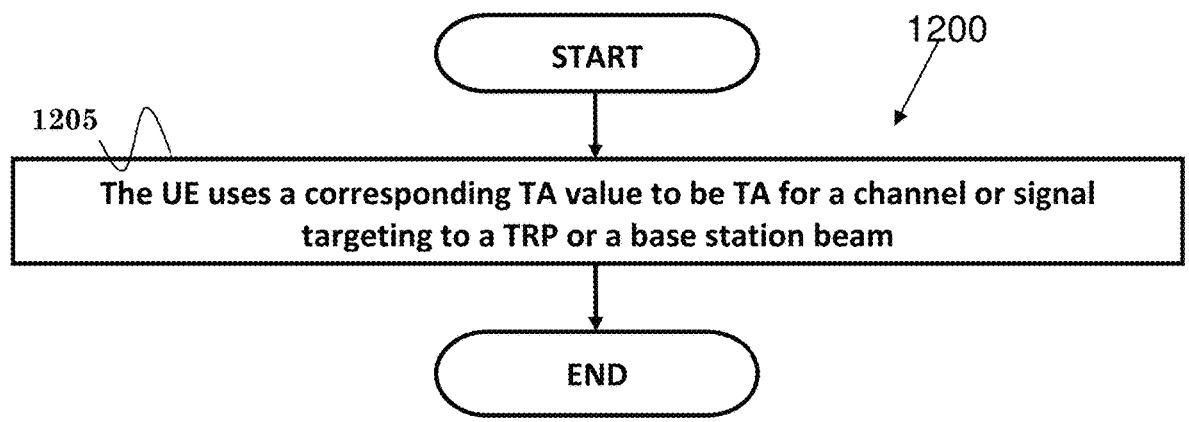
FIG. 12 is a flow chart according to one exemplary embodiment.

FIG. 12 is a flow chart 1200 according to one exemplary embodiment from the perspective of a UE. In step 1205, the UE uses a corresponding TA value to be TA for a channel/signal targeting to a TRP/base station beam.

In one embodiment, the UE could receive from a base station an association between the resource(s) or transmission occasion(s) of the uplink channel or signal and a TRP, a base station beam, a UE beam, or a TA value. The channel or signal could be transmitted with high TA accuracy level.

In another embodiment, the resource could be periodic resource, semi-persistent resource or an aperiodic resource. The association is indicated or configured by mapping with a resource(s) with a TRP id, a base station id, a UE beam id, or a TA value. The UE would perform the configured or indicated transmission(s) of the uplink channel or signal with the associated TA value for the TRP, the base station beam, the UE beam, or the TA value. The UE could be served by multiple TRPs. More specifically, the UE could be configured with multiple sets of resources or transmission occasion(s), each associated with one TRP. The UE maintains an association or linkage between any two among the followings: a TRP, a base station beam, a UE beam, and a TA value. The channel or signal can be SRS or SR.

Referring back to FIGS. 3 and 4, in one exemplary embodiment of a UE, the device 300 includes a program code 312 stored in the memory 310. The CPU 308 could execute program code 312 to enable the UE to use a corresponding TA value to be TA for a channel/signal targeting to a TRP/base station beam. Furthermore, the CPU 308 can execute the program code 312 to perform all of the above-described actions and steps or others described herein.

Figure 13:
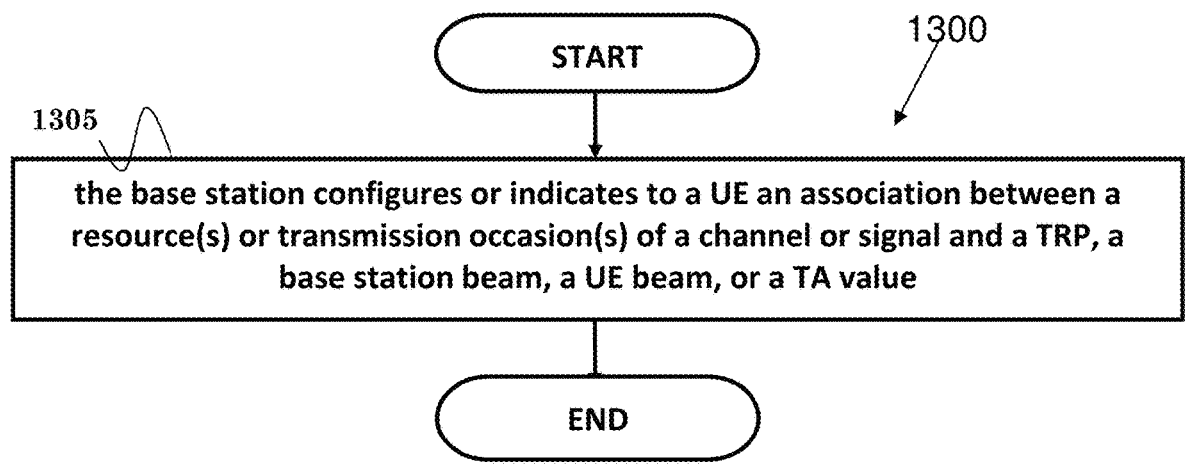
FIG. 13 is a flow chart according to one exemplary embodiment.

FIG. 13 is a flow chart 1300 according to one exemplary embodiment from the perspective of a base station. In step 1305, the base station configures or indicates to a UE an association between a resource(s) or transmission occasion(s) of a channel or signal and a TRP, a base station beam, a UE beam, or a TA value.

In one embodiment, the channel or signal is transmitted with high TA accuracy level.

In another embodiment, the resource could be periodic resource, semi-persistent resource, or an aperiodic resource. The association is indicated or configured by mapping with a resource(s) with a TRP id, a base station id, a UE beam id, or a TA value. The UE would perform the configured or indicated transmission(s) of the uplink channel or signal with the associated TA value for the TRP, the base station beam, the UE beam, or the TA value. The UE could be served by multiple TRPs. More specifically, the UE could be configured with multiple sets of resources or transmission occasion(s), each associated with one TRP. The UE could maintain an association or linkage between any two among the followings: a TRP, a base station beam, a UE beam, and a TA value. The channel or signal can be SRS or SR.

Referring back to FIGS. 3 and 4, in one exemplary embodiment of a base station, the device 300 includes a program code 312 stored in the memory 310. The CPU 308 could execute program code 312 to enable the base station to configure or indicate to a UE an association between a resource(s) or transmission occasion(s) of a channel or signal and a TRP, a base station beam, a UE beam, or a TA value. Furthermore, the CPU 308 can execute the program code 312 to perform all of the above-described actions and steps or others described herein.

Figure 14:
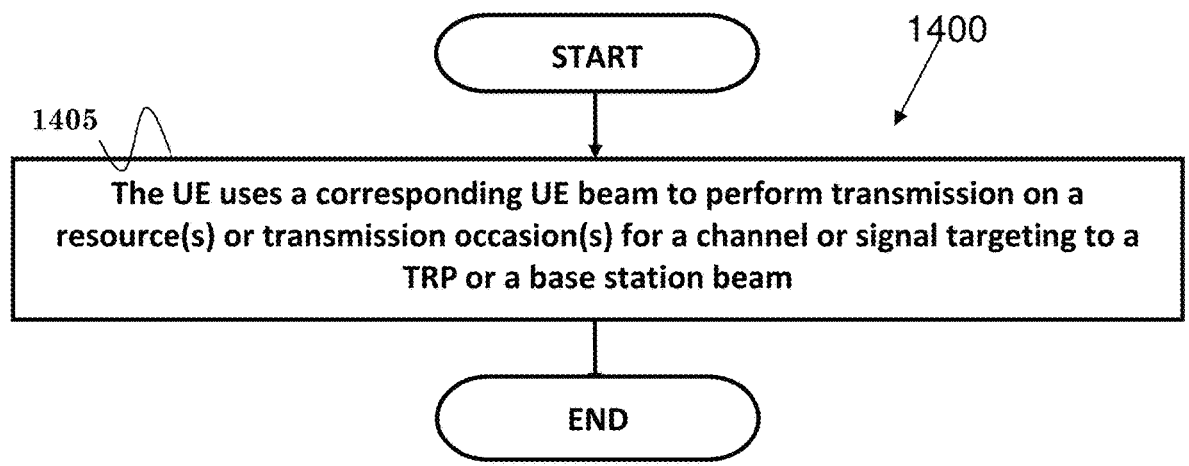
FIG. 14 is a flow chart according to one exemplary embodiment.

FIG. 14 is a flow chart 1400 according to one exemplary embodiment from the perspective of a UE. In step 1405, the UE uses a corresponding UE beam to perform transmission on a resource(s) or transmission occasion(s) for a channel or signal targeting to a TRP/base station beam.

In one embodiment, the UE receives from a base station an association between the resource(s)/transmission occasion(s) of the uplink channel or signal and a TRP, a base station beam, a UE beam, or a TA value. The channel signal is transmitted with high TA accuracy level.

In another embodiment, the resource could be periodic resource, semi-persistent resource or an aperiodic resource. The association is indicated or configured by mapping with a resource(s) with a TRP id, a base station id, a UE beam id, or a TA value. The UE would perform the configured or indicated transmission(s) of the uplink channel or signal with the associated UE beam for the TRP, the base station beam, the UE beam, or the TA value. The UE could be served by multiple TRPs. More specifically, the UE is configured with multiple sets of resources or transmission occasion(s), each associated with one TRP. The UE could maintain an association or linkage between any two among the followings: a TRP, a base station beam, a UE beam, and a TA value. The channel or signal can be SRS or SR.

Referring back to FIGS. 3 and 4, in one exemplary embodiment of a UE, the device 300 includes a program code 312 stored in the memory 310. The CPU 308 could execute program code 312 to enable the UE to use a corresponding UE beam to perform transmission on a resource(s)/transmission occasion(s) for a channel/signal targeting to a TRP/base station beam. Furthermore, the CPU 308 can execute the program code 312 to perform all of the above-described actions and steps or others described herein.

Figure 15:
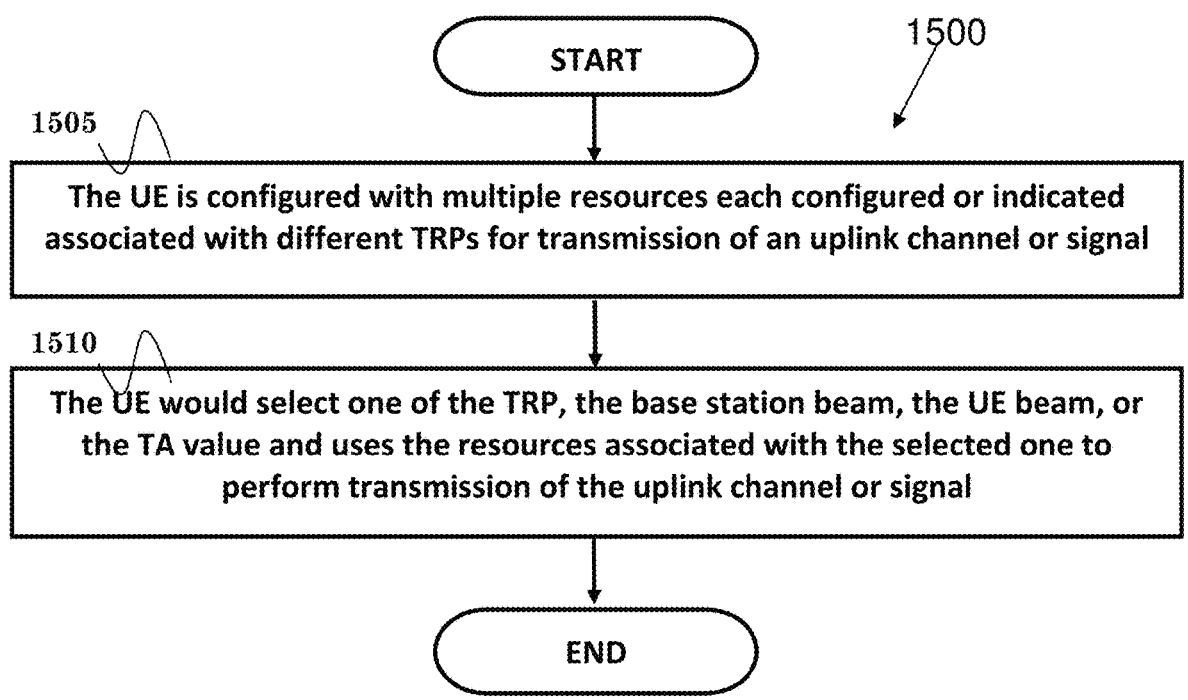
FIG. 15 is a flow chart according to one exemplary embodiment.

FIG. 15 is a flow chart 1500 according to one exemplary embodiment from the perspective of a UE. In step 1505, the UE is configured with multiple resources each configured or indicated associated with different TRPs for transmission of an uplink channel or signal. In step 1510, the UE would select one of the TRP, the base station beam, the UE beam, or the TA value and uses the resources associated with the selected one to perform transmission of the uplink channel or signal.

In one embodiment, the channel or signal is transmitted with high TA accuracy level. The transmission of the uplink channel or signal is performed with a TA value or a UE beam associated with the selected TRP, the selected base station beam, the selected UE beam, or the selected TA value.

In another embodiment, the selection can be based on a configured priority, a type of TRP, base station beam, UE beam, or TA value, the actual TA value, a DL measurement, or a sequence of the resources in time domain. For example, the closest/next resource is selected.

In one embodiment, the multiple resources are on the same time duration or symbol. Alternatively, the multiple resources are on different time durations or symbols. The channel or signal can be SRS or SR.

Referring back to FIGS. 3 and 4, in one exemplary embodiment of a UE, the device 300 includes a program code 312 stored in the memory 310. The CPU 308 could execute program code 312 to enable the UE (i) configured with multiple resources each configured/indicated associated with different TRPs for transmission of an uplink channel or signal and (ii) to select one of the TRP, the base station beam, the UE beam, or the TA value and uses the resources associated with the selected one to perform transmission of the uplink channel or signal. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a base station, comprising:
the base station configures a User Equipment (UE) with multiple transmission occasions for a signal and the multiple transmission occasions are resources for the signal;
the base station indicates to the UE (i) an association between a transmission occasion among the multiple transmission occasions and a base station beam and (ii) an association between a second transmission occasion among the multiple transmission occasions and a second base station beam, wherein the signal is a sounding reference signal and is transmitted periodically; and
the base station receives the signal in the multiple transmission occasions from the UE, wherein the transmission occasion comprises a single sounding reference signal and the second transmission occasion comprises a second single sounding reference signal.

2. The method of claim 1, wherein the base station receives the signal in the transmission occasion with the base station beam associated with the transmission occasion.

3. The method of claim 1, wherein the signal is used for channel quality acquisition of the UE.

4. The method of claim 1, wherein the signal is used for beam maintenance.

5. The method of claim 1, wherein the multiple transmission occasions are grouped into multiple sets and each set is associated with a Transmission/Reception Point (TRP).

6. A method of a User Equipment (UE), comprising:
- the UE receives from a base station a configuration of multiple transmission occasions for a signal and the multiple transmission occasions are resources for the signal;
- the UE receives from the base station information indicating (i) an association between a transmission occasion among the multiple transmission occasions and a base station beam and (ii) an association between a second transmission occasion among the multiple transmission occasions and a second base station beam, wherein the signal is a sounding reference signal and is transmitted periodically; and
- the UE transmits the signal in the multiple transmission occasions to the base station wherein the transmission occasion comprises a single sounding reference signal and the second transmission occasion comprises a second single sounding reference signal.

7. The method of claim 6, wherein the UE transmits the signal in the transmission occasion with a UE beam associated with the transmission occasion.

8. The method of claim 6, wherein the signal is used for channel quality acquisition of the UE.

9. The method of claim 6, wherein the signal is used for beam maintenance.

10. The method of claim 1, wherein the multiple transmission occasions are grouped into multiple sets and each set is associated with a Transmission/Reception Point (TRP).

11. A method of a User Equipment (UE), comprising:
- the UE is served by multiple Transmission/Reception Points (TRP) of a base station, wherein the multiple TRPs are associated with TA (Timing Advance) values and each of the multiple TRPs of the base station is associated with a TA value of the TA values;
- the UE determines a specific TA value based on the TA values associated with the multiple TRPs of the base station;
- the UE uses the specific TA value to be a TA for transmitting a first signal targeting the multiple TRPs of the base station; and
- the UE uses a TA value corresponding to a TRP for transmitting a second signal targeting the TRP, wherein the TA value is associated with the TRP.

12. The method of claim 11, wherein the first signal and the second signal are transmitted with different cyclic prefix (CP) lengths.

13. The method of claim 11, wherein the specific TA value determined by the UE is the largest TA value of the TA values associated with the multiple TRPs of the base station.

14. The method of claim 11, wherein an association between resource(s) or transmission occasion(s) of the second signal and a TRP is indicated by the base station.

15. The method of claim 11, wherein a first CP length used for transmitting the first signal is greater than a second CP length used for transmitting the second signal.

16. The method of claim 11, wherein the UE is configured with multiple sets of resource(s) or transmission occasion(s) for the second signal, each set of resource(s) or transmission occasion(s) is associated with one TRP.

17. The method of claim 11, wherein the second signal is transmitted with a corresponding UE beam for the TRP.

18. The method of claim 11, wherein the specific TA value is determined by the UE based on an average of the TA values associated with the multiple TRPs of the base station.

* * * * *